(12) United States Patent
Chaufour et al.

(10) Patent No.: US 8,678,486 B2
(45) Date of Patent: Mar. 25, 2014

(54) DAMPING STOP FOR HINGE, ESPECIALLY FOR VEHICLE DOOR HINGE

(71) Applicant: Renault s.a.s., Boulogne Billancourt (FR)

(72) Inventors: Olivier Chaufour, Maisons Alfort (FR); Fabrice Tomas, Paris (FR); Alain Gitton, Arpajon (FR)

(73) Assignee: Renault s.a.s., Boulogne Billancourt (FR)

( * ) Notice: Subject to any disclaimer, the term of this patent is extended or adjusted under 35 U.S.C. 154(b) by 0 days.

(21) Appl. No.: 13/647,115

(22) Filed: Oct. 8, 2012

(65) Prior Publication Data

US 2013/0214561 A1     Aug. 22, 2013

(30) Foreign Application Priority Data

Feb. 17, 2012 (FR) ........................................ 1251464

(51) Int. Cl.
    *E05F 5/02*            (2006.01)
    *B60J 5/00*            (2006.01)

(52) U.S. Cl.
    USPC ........... 296/207; 296/146.11; 16/374; 16/375

(58) Field of Classification Search
    USPC ......... 296/146.11, 207; 292/DIG. 3; 16/86 A, 16/221, 363, 371, 374, 375
    See application file for complete search history.

(56) References Cited

U.S. PATENT DOCUMENTS 1,211,366 A * 1/1917 Fisher .............................. 16/375
2005/0093342 A1 * 5/2005 Kim .............................. 296/207

* cited by examiner

*Primary Examiner* — Glenn Dayoan
*Assistant Examiner* — Jason S Daniels
(74) *Attorney, Agent, or Firm* — Oblon, Spivak, McClelland, Maier & Neustadt, L.L.P.

(57) ABSTRACT

A damping stop for damping the rotation of two members connected by a hinge shaft is formed by a block of elastomeric material. The damping stop includes a fastening zone inserted forcibly into a seat situated between the first member and the hinge shaft, a contact zone that enters into contact with the second member after pivoting thereof around the hinge shaft in the direction of the first member, and a compression zone formed by a material void in the interior of the block of elastomeric material. The material void extends over the entire length of the damping stop in a direction parallel to the hinge shaft when the damping stop is inserted into the seat. The damping stop is used in a hinge of a vehicle.

12 Claims, 2 Drawing Sheets

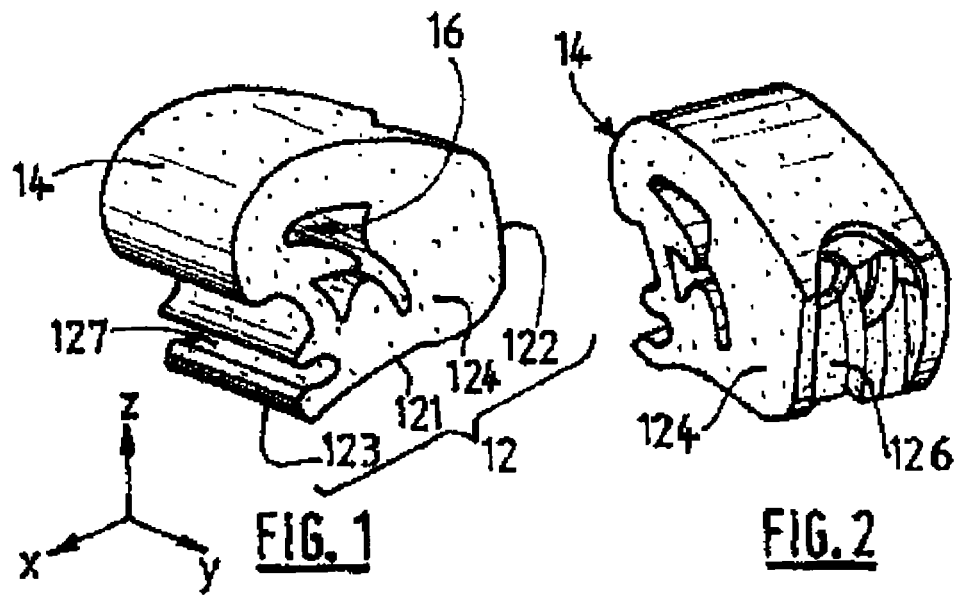
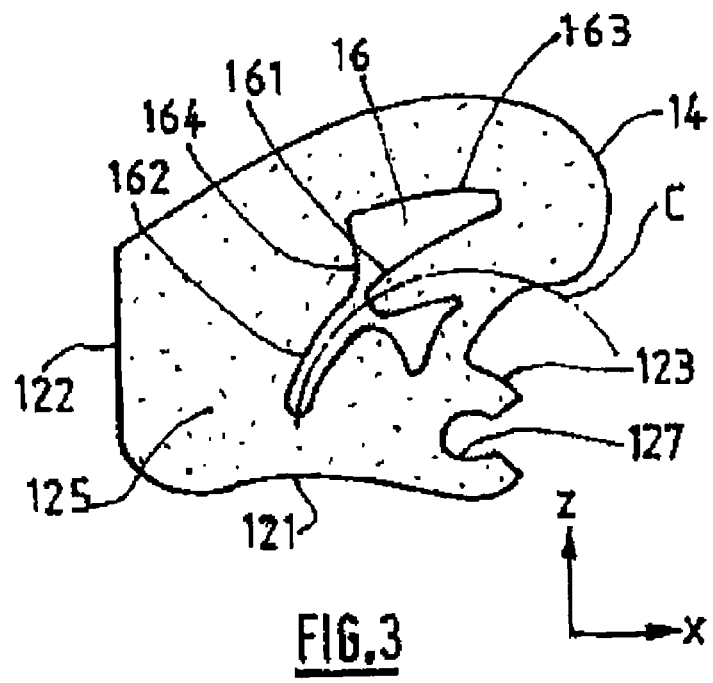

DAMPING STOP FOR HINGE, ESPECIALLY FOR VEHICLE DOOR HINGE

CROSS-REFERENCE TO RELATED APPLICATION

The present application claims the benefit of foreign priority to French Application No. 1251464, filed Feb. 17, 2012, the entire contents of which are incorporated by reference herein.

BACKGROUND

The invention relates to a damping stop for a hinge, especially for a vehicle door hinge. The invention also relates to the use of this damping stop to damp the pivoting of two parts and to a vehicle comprising such a damping stop.

In certain vehicles it is possible to observe rebounding at the end of opening of a closure means, which may cause fatigue and premature wear of the members forming the hinge of the closure means.

Devices for damping the opening of a closure means exist, especially closure means of vehicles, but they are generally complex to construct and install.

BRIEF SUMMARY

The objective of the invention is to remedy these disadvantages by proposing a damping stop that is simple to construct and install.

To this end the object of the invention relates to a damping stop for damping the rotation of two members connected by a hinge shaft, characterized in that it is formed by a block of elastomeric material and in that it comprises:

- a fastening zone conformed to be inserted forcibly into a seat situated between the first member and the hinge shaft,
- a contact zone conformed to enter into contact with the second member after pivoting thereof around the hinge shaft in the direction of the first member,
- a compression zone formed by a material void in the interior of the block of elastomeric material, this material void extending over the entire length of the damping stop in a direction parallel to the hinge shaft when the damping stop is inserted into the said seat.

Such a stop has the advantage that it may be constructed very simply from a single material and does not necessitate any tool for fastening thereof: thus it may be constructed and installed easily and quickly.

For example, forcible insertion of the stop may be achieved simply by constructing the fastening zone with a shape complementary to the shape of the said seat but having dimensions larger than those of the seat, these dimensions being chosen so as to permit the fastening zone to be forcibly inserted in the interior of the seat and to be held in the interior thereof.

The compression zone makes it possible to damp the pivoting movement of the two members by compression of the internal void of the stop.

Advantageously, and in non-limitative manner, the fastening zone comprises a groove conformed to receive the hinge shaft when the stop is inserted into the said seat. This may make it possible to improve how well the stop is held in the interior of the seat.

Advantageously, and in non-limitative manner, the contact zone has a convex rounded shape. This may make it possible to facilitate the distribution of the force applied by the second member on the contact zone during pivoting of the second member toward the first member and in this way to obtain more homogeneous compression of the stop.

Advantageously, and in non-limitative manner, the compression zone comprises a male part and a corresponding female part conformed so that the male part engages with friction in the interior of the female part when the second member pivots in the direction of the first member and compresses the damping stop. This arrangement makes it possible to absorb more energy by friction and contributes to slowing and controlling the pivoting movement of the second member relative to the first. In this way it is possible to reduce and even suppress rebounding of the second member relative to the first, particularly at the end of rotation of the second member. In addition, this arrangement makes it possible to prolong the useful life of the damping stop, less subjected to compressive stress.

Advantageously, and in non-limitative manner, the male and female parts have a rounded elongated shape, the curvature of which, in a plane perpendicular to the hinge shaft, corresponds to the curvature of a circle centered on the hinge shaft, the said male and female parts being positioned on this circle. This configuration makes it possible to facilitate the insertion of the male part in the interior of the female part, particularly when the damping stop is already partly deformed by the fact of pivoting of the second member toward the first member.

This male part is, for example, integral with a material part forming the damping stop situated between the compression zone and the contact zone.

Advantageously, and in non-limitative manner, the compression zone comprises two stopping surfaces positioned and conformed to come into contact with one another and to limit the compression of the damping stop when the second member has pivoted by a predetermined angle in the direction of the first member. Thus, when these stopping surfaces are in contact, the damping stop cannot be further compressed: the second member then cannot pivot further in the direction of the first member. These stopping surfaces therefore determine the maximum compression permitted by the damping stop and the maximum rotation of the second member relative to the first member. These stopping surfaces are generally plane surfaces.

The invention also relates to the use of a damping stop according to the invention to damp the relative pivoting of two members connected by a hinge shaft, especially two members of a motor vehicle, the damping stop being inserted between a first of the members and the hinge shaft in order to damp the pivoting of the second of the members in the direction of the first member.

For example, the first member may be a structural element (or part thereof) of a vehicle supporting a hinge shaft, and the second member may be a vehicle closure means (or part thereof) hinged on the first member by means of the hinge shaft.

Such a use is particularly advantageous for the motor vehicles having a lightweight structure, for example vehicles with electric motors, particularly of small size. The damping stop according to the invention effectively makes it possible to damp the opening of the closure means in simple manner, without increasing the vehicle weight and without the need to modify the hinge.

Thus the invention also relates to a motor vehicle, especially an electric vehicle, having at least one opening on one side to permit the occupants to enter and exit, this opening being able to be shut off completely or partly by a closure means attached to the vehicle structure by a hinge shaft, characterized in that it comprises at least one damping stop according to the invention positioned between the structure and the hinge shaft for damping the pivoting of each closure means in the direction of the structure.

In this type of vehicle, the closure means, which may be a simple lateral protection device, may be attached to the vehicle structure by a single hinge.

In particular, the hinge shaft of the one or more closure means may extend in a direction transverse relative to the vehicle, thus permitting the closure means to open in "gullwing" style. The use of a damping stop according to the invention is then particularly advantageous, since the end of opening of the closure means often corresponds to a position in which the closure means tends to swivel down with increasing speed under the effect of gravity. The damping stop according to the invention permits control of the pivoting speed and gentle stopping of the pivoting at the end of opening in gullwing style.

BRIEF DESCRIPTION OF THE DRAWINGS

The invention is now described with reference to the non-limitative attached drawings, wherein:

FIGS. 1 and 2 are respectively perspective front and rear views of a damping stop according to the invention;

FIG. 3 is a side view of the damping stop represented in FIGS. 1 and 2;

DETAILED DESCRIPTION

In the present description, the terms front, rear, upper, lower refer to the front and rear directions of the vehicle when the damping stop is installed on a vehicle. The X, Y, Z axes correspond respectively to the longitudinal (from front to rear), transversal and vertical axes of the vehicle.

FIGS. 1 to 3 represent a damping stop 10 for damping the rotation of two members connected by a hinge shaft.

Figure 4:
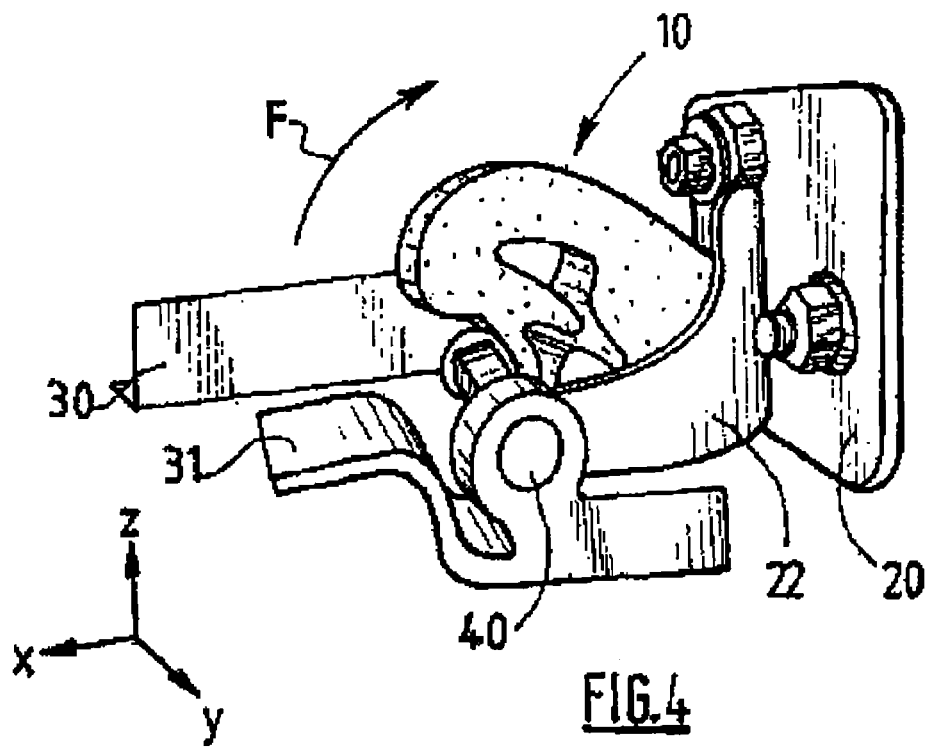
FIG. 4 is a perspective view of a hinge equipped with the damping stop represented in FIGS. 1 to 3, the damping stop being in non-compressed condition.
Figure 5:
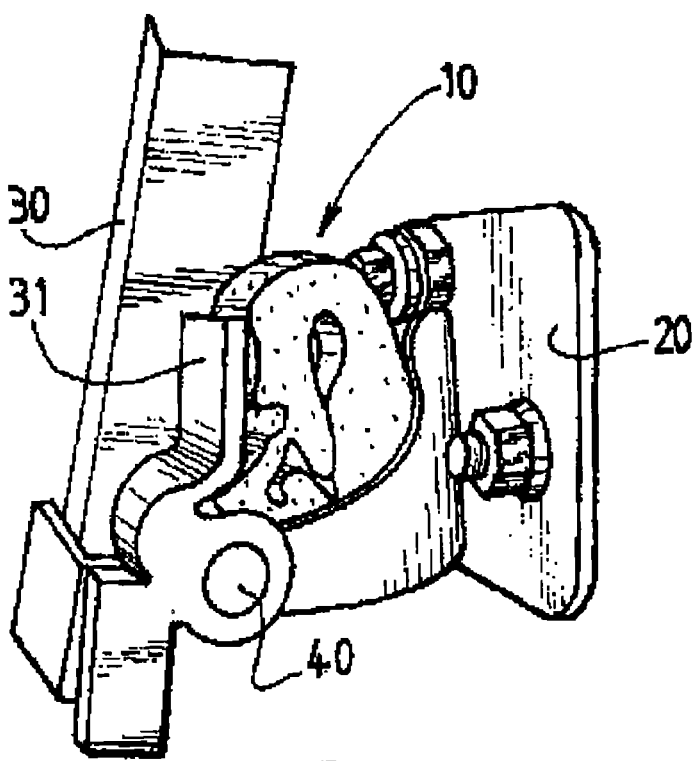
FIG. 5 is a view similar to that of FIG. 4, the damping stop being in compressed condition.

These members are represented in FIGS. 4 and 5. A first member 20 is part of a structural element of a vehicle. The second member 30 is part of a closure means. These first and second members 20, 30 are connected by a hinge shaft 40. This hinge shaft 40 is supported by first member 20 by means of a support 22 integral with member 20. Thus a space exists between first member 20 and hinge shaft 40, this space being able to form a seat for damping stop 10 according to the invention. Hinge shaft 40 may extend in a direction transverse relative to the vehicle, thus permitting the closure means to open in "gullwing" style.

This damping stop 10 is formed from a block of elastomeric material. The elastomeric material may be, for example, EPDM or any other elastomeric material.

Damping stop 10 comprises:
a fastening zone 12 conformed to be inserted forcibly into a seat situated between first member 20 and hinge shaft 40,
a contact zone 14 conformed to enter into contact with second member 30 after pivoting thereof around hinge shaft 40 in the direction of first member 20 (FIG. 5),
a compression zone 16 formed by a material void in the interior of the block of elastomeric material, this material void extending over the entire length of damping stop 10 in a direction parallel to hinge shaft 40 when damping stop 10 is inserted into the seat.

Fastening zone 12 has a shape complementary to the shape of the seat but its dimensions are larger than those of the seat, these dimensions being chosen so as to permit the fastening zone to be forcibly inserted in the interior of the seat and to be held in the interior thereof.

In the represented example, fastening zone 12 comprises three surfaces 121, 122, 123 of damping stop 10, adjacent to one another in pairs, and two opposite surfaces 124, 125. A first surface 121 forms a lower surface of damping stop 10, a second surface 122 forms a lateral surface and a third surface 123 forms the lower part of a lateral surface opposite lateral surface 122. The other surfaces 124, 125 form the lower parts of two other sides of damping stop 10. These different surfaces 121-125 are intended to be in contact with the walls of the seat receiving damping stop 10. Their shapes may therefore vary according to the seat shape.

In the represented example, lower surface 121 is substantially curved and lateral surface 122 comprises a cavity 126 of shape complementary to part of the seat. Third surface 123 contains a groove 127 conformed to receive hinge shaft 40 when damping stop 10 is inserted into the seat between the two hinged members 20 and 30. Groove 127 thus extends parallel to hinge shaft 40 when damping stop 10 is inserted into the seat. Groove 127 may have a shape substantially complementary to the shape of hinge shaft 40 and may have an opening with a dimension such that hinge shaft 40 is held in the interior of groove 127, as visible in FIG. 3. Damping stop 10 may then be clipped onto hinge shaft 40, by cooperation of groove 127 and hinge shaft 40. Furthermore, the distance between surface 122 and groove 127 contributes to holding stop 10 in place on member 22 and on hinge shaft 40.

Contact zone 14 is an external surface of damping stop 10 that is the surface against which second member 30 will come into contact and exert a pressure during pivoting of second member 30 toward first member 20. This contact zone 14 may have convex rounded shape.

In the represented example, contact zone 14 has a rounded shape in a plane transversal to hinge shaft 40 when damping stop 10 is inserted into its seat (FIG. 3). This makes it possible to facilitate the construction of damping stop 10.

Compression zone 16 of the represented example comprises a male part 161 and a corresponding female part 162 conformed so that male part 161 engages with friction in the interior of female part 162 when second member 30 pivots in the direction of first member 20 and compresses damping stop 10. This friction makes it possible to absorb the energy induced by the movement of member 30 and contributes to slowing it. Thus the dimensions of male part 161 are larger than the dimensions of female part 162, in order that male part 161 is able to penetrate with friction into the interior of female part 162. In the example, male part 161 has the form of a projecting strip of material having rounded elongated shape, the curvature of which, in a plane perpendicular to hinge shaft 40, corresponds to the curvature of a circle centered on hinge shaft 40. Correspondingly, female part 162 has the form of a groove of rounded elongated shape, of the same curvature as male part 161, in a plane perpendicular to hinge shaft 40. Male and female parts 161 and 162 respectively are therefore situated facing one another in compression zone 16 and are disposed on the same circle C centered on hinge shaft 40 (FIG. 3).

Male part 161 is additionally integral with a material part forming damping stop 10 situated between fastening zone 12 and contact zone 14, as visible in FIGS. 1 and 3. Thus, when second member 30 comes into contact with contact zone 14 and begins to deform it, male part 161 is simultaneously displaced in the direction of female part 162.

In general, and as represented in the example, male and female parts 161 and 162 respectively extend over the entire length of damping stop 10 in a direction parallel to hinge shaft 40 when damping stop 10 is inserted into its seat (direction parallel to the Y axis in the figures). This configuration makes it possible to simplify the construction of damping stop 10. Nevertheless, it is possible to envision more complex configurations in which one or more male and female parts are provided distributed along this length.

Compression zone 16 also comprises two stopping surfaces 163 and 164 positioned and conformed to come into contact with one another and to limit the compression of damping stop 10. These stopping surfaces 163, 164 are generally plane surfaces, such as represented in the figures. Their positioning in compression zone 16 will therefore depend on the maximum desired compression of damping stop 10 and therefore on the maximum permitted displacement of second member 30 in the direction of first member 20. When first and second members 20, 30 respectively form part of a structural element of a vehicle and of a closure means, the configuration of these stopping surfaces 163, 164 makes it possible to determine the maximum angle of opening of the closure means relative to the structural element.

FIGS. 4 and 5 illustrate the behavior of damping stop 10 described hereinabove during the relative pivoting of first and second members 20, 30.

FIG. 4 represents a state in which damping stop 10 is not compressed, corresponding in the example to a closed position of a closure means, of which second member 30 is a part. Damping stop 10 is then inserted into the seat situated between first member 20 and hinge shaft 40 so that its fastening zone 12 is hardly visible. In this position, hinge shaft 40 is inserted into groove 127 of damping stop 10. During opening of the closure means, second member 30 is pivoted around hinge shaft 40 in the direction of first member 20, in the direction of arrow F represented in FIG. 4. A part 31 of second member 30 then enters into contact with contact surface 14 of damping stop 10 and begins to compress it. In the course of this compression of compression zone 16, male part 161 is displaced so as to follow circle C and penetrates with friction into female part 162, until stopping surfaces 163, 164 are in contact, as represented in FIG. 5, thus blocking pivoting of second member 30. The friction of male and female parts 161 and 162 respectively makes it possible to slow the pivoting of second member 30 relative to first member 20, while the contact of stopping surfaces 163, 164 completely stops this pivoting. In this way, it is possible for second member 30 to be moved without rebounding.

The invention claimed is:

1. A damping stop for damping the rotation of a first member and a second member connected by a hinge shaft, the damping stop being formed by a block of elastomeric material, the damping stop comprising:
    a fastening zone configured to be inserted forcibly into a seat situated between the first member and the hinge shaft;
    a contact zone configured to enter into contact with the second member after pivoting thereof around the hinge shaft in the direction of the first member; and
    a compression zone formed by a material void in the interior of the block of elastomeric material, this material void extending over the entire length of the damping stop in a direction parallel to the hinge shaft when the damping stop is inserted into the seat,
    wherein the compression zone comprises a male part and a corresponding female part configured so that the male part engages with friction in an interior of the female part when the second member pivots in the direction of the first member and compresses the damping stop.

2. The damping stop according to claim 1, wherein the fastening zone comprises a groove configured to receive the hinge shaft when the damping stop is inserted into the seat.

3. The damping stop according to claim 1, wherein the contact zone has a convex rounded shape.

4. The damping stop according to claim 1, wherein the male part and the female part have a rounded elongated shape, the curvature of which, in a plane perpendicular to the hinge shaft, corresponds to the curvature of a circle centered on the hinge shaft, the male part and the female part being positioned on this circle.

5. The damping stop according to claim 1, wherein the compression zone comprises two stopping surfaces positioned and configured to come into contact with one another and to limit the compression of the damping stop when the second member has pivoted by a predetermined angle in the direction of the first member.

6. The damping stop according to claim 1, wherein the damping stop damps the relative pivoting of the first and second members connected by the hinge shaft, the damping stop being inserted between the first member and the hinge shaft in order to damp the pivoting of the second member in the direction of the first member.

7. The damping stop according to claim 6, wherein the first member is a structural element of the vehicle supporting the hinge shaft, and the second member is a vehicle closure means hinged on the first member by the hinge shaft.

8. A motor vehicle, comprising:
    at least one opening on one side to permit the occupants to enter and exit, the opening being able to be shut off completely or partly by a closure means attached to the vehicle structure by a hinge shaft; and
    a damping stop positioned between the structure and the hinge shaft for damping the rotation of a first member and a second member of the closure means in the direction of the structure, the damping stop including
        a fastening zone configured to be inserted forcibly into a seat situated between the first member and the hinge shaft,
        a contact zone configured to enter into contact with the second member after pivoting thereof around the hinge shaft in the direction of the first member, and
        a compression zone formed by a material void in the interior of the block of elastomeric material, this material void extending over the entire length of the damping stop in a direction parallel to the hinge shaft when the damping stop is inserted into the seat,
    wherein the compression zone comprises a male part and a corresponding female part configured so that the male part engages with friction in an interior of the female part when the second member pivots in the direction of the first member and compresses the damping stop.

9. The motor vehicle according to claim 8, wherein the hinge shaft of the closure means extends in a direction transverse relative to the vehicle.

10. The motor vehicle according to claim 8, wherein the vehicle is an electric vehicle.

11. The motor vehicle according to claim 8, wherein the male part and the female part have a rounded elongated shape, the curvature of which, in a plane perpendicular to the hinge shaft, corresponds to the curvature of a circle centered on the hinge shaft, the male part and the female part being positioned on this circle.

12. The motor vehicle according to claim 8, wherein the compression zone comprises two stopping surfaces positioned and configured to come into contact with one another and to limit the compression of the damping stop when the second member has pivoted by a predetermined angle in the direction of the first member.

* * * * *